United States Patent [19]
Litomisky et al.

[11] Patent Number: 6,012,199
[45] Date of Patent: Jan. 11, 2000

[54] REFUSE VACUUM SYSTEM FOR MACHINE SHOPS

[76] Inventors: Petr Litomisky; Ales Litomisky, both of 1954 Canyon Dr., Hollywood, Calif. 90068

[21] Appl. No.: 09/003,989

[22] Filed: Jan. 7, 1998

[51] Int. Cl.[7] .................. F23J 1/00; A47L 5/38
[52] U.S. Cl. .................. 15/301; 15/314; 15/331; 15/339
[58] Field of Search .............. 15/301, 314, 331, 15/339; 137/240; 251/81, 129.11, 301, 302

[56] References Cited

U.S. PATENT DOCUMENTS

| | | | |
|---|---|---|---|
| 1,048,477 | 12/1912 | Allington | 15/301 |
| 2,722,396 | 11/1955 | Carr | 251/81 |
| 3,203,664 | 8/1965 | Ver Nooy | 251/302 |
| 4,701,192 | 10/1987 | Burke . | |
| 4,721,516 | 1/1988 | Barsacq . | |
| 4,977,638 | 12/1990 | Best . | |
| 4,991,253 | 2/1991 | Rechsteiner . | |
| 5,067,394 | 11/1991 | Cavallero . | |
| 5,136,750 | 8/1992 | Takashima et al. . | |
| 5,173,987 | 12/1992 | Buckingham . | |
| 5,201,095 | 4/1993 | Choi . | |
| 5,237,896 | 8/1993 | Albright et al. . | |
| 5,319,827 | 6/1994 | Yang . | |
| 5,323,483 | 6/1994 | Baeg . | |
| 5,323,821 | 6/1994 | Suzuki . | |
| 5,383,250 | 1/1995 | Sohler . | |
| 5,388,607 | 2/1995 | Ramaker et al. . | |
| 5,388,968 | 2/1995 | Wood et al. . | |
| 5,396,923 | 3/1995 | Allen et al. . | |
| 5,437,732 | 8/1995 | Igarashi et al. . | |
| 5,504,967 | 4/1996 | Graham | 15/314 |
| 5,566,421 | 10/1996 | Pittman . | |
| 5,606,767 | 3/1997 | Crienjak et al. . | |

FOREIGN PATENT DOCUMENTS

| | | | |
|---|---|---|---|
| 1149868 | 4/1961 | Germany | 15/314 |
| 189263 | 11/1966 | U.S.S.R. | 251/301 |

*Primary Examiner*—Terrence R. Till
*Attorney, Agent, or Firm*—Cislo & Thomas LLP

[57] ABSTRACT

A vacuum system for machine shop dust, particulate matter, and the like. Blast gates control the flow of vacuum generated by a dust collector to individual machines that may or may not accommodate vacuum ductwork and the like. The blast gate has a rotating blade inside a chassis with a DC motor effectively using a slip clutch or an increased current feedback system to limit the rotation driving of the rotating blade. Importantly, a small aperture serves to allow air flow into the chassis gap through which the rotating blade rotates in order to ensure the particular matter does not lodge inside the chassis thereby preventing the proper operation of the rotating blade. A central controller having a microprocessor or the like may be programmed or programmable and serve to individually control a selected number of blast gates based upon a feedback mechanism. A piezoelectric sensor or the like senses the vibration arising from the turning on of the associated machinery, indicating the demand for vacuum power to collect particulate matter. In response to the piezoelectric sensor's signal, the blast gate is opened and the dust collector is either turned on or stepped up to accommodate the increase load upon the vacuum system. The reverse situation occurs when the machinery is turned off. The piezoelectric sensor ceases signalling the central controller of the machine "on" condition. The central controller then steps down the dust collector/vacuum system and closes the associated blast gate. Alternative embodiments are set forth whereby additional features provide for enhanced utility, including a computer operation, control, monitoring, and feedback.

14 Claims, 6 Drawing Sheets

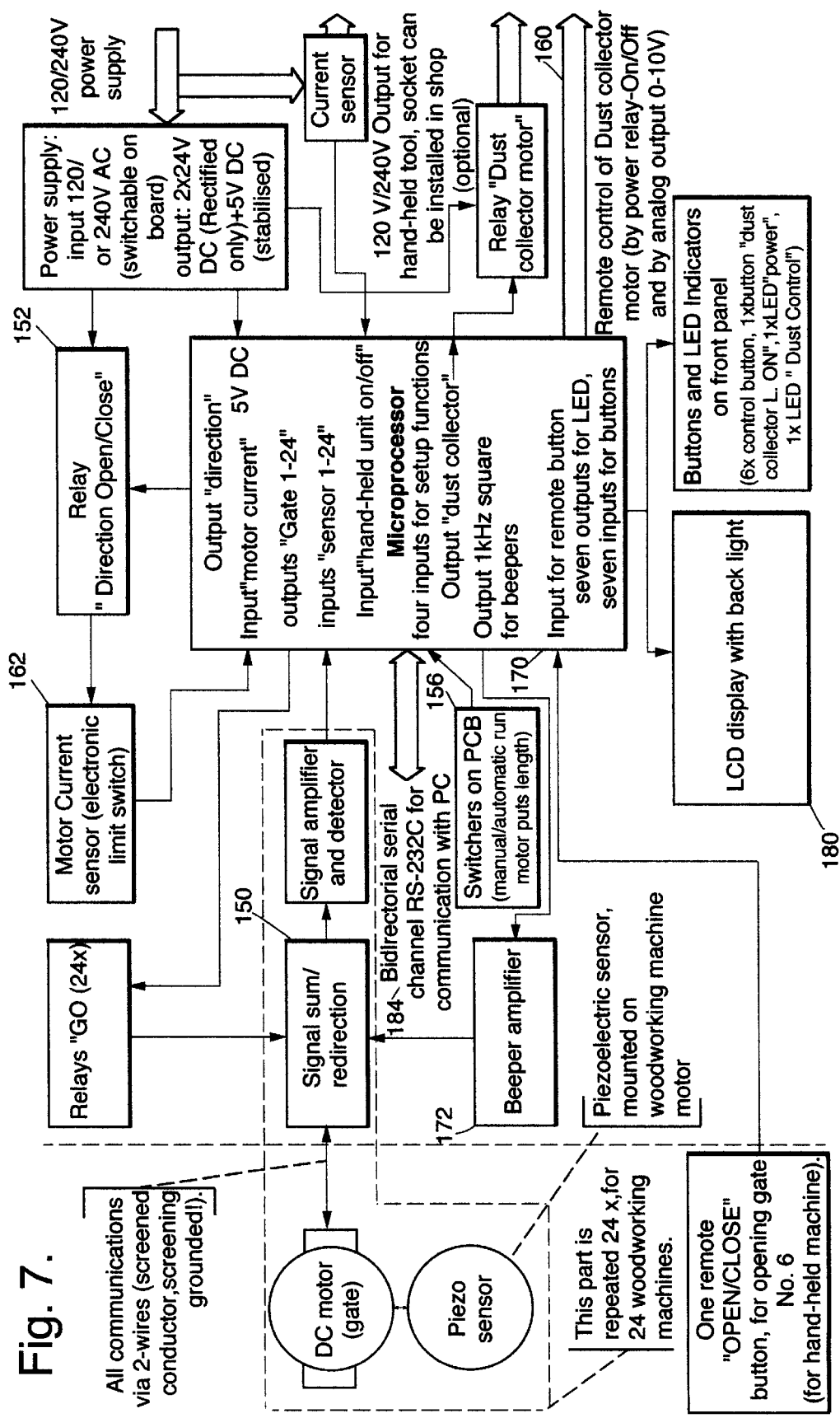

REFUSE VACUUM SYSTEM FOR MACHINE SHOPS

BACKGROUND OF THE INVENTION

1. Field of the Invention

This invention relates to gate valves used in machine shops that serve to control the flow of suction in collecting sawdust, mill filings and the like and more particularly to an electric gate valve and accompanying system allowing the efficient operation of vacuum collection of dust and filings.

2. Description of the Related Art

In machine shops, woodworking shops, and the like, work pieces are milled, lathed, drilled, formed, etc. to achieve the ends of the craft. In altering the structure of the workpiece, dust, filings and/or tailings are created. For example, when sawing a piece of wood, sawdust will collect adjacent the area of the saw blade. Likewise, for lathing or milling processes, shavings or tailings from the metal workpiece about or below the cutting blade.

The sawdust and/or metal shavings that collect in the workshop can become dangerous. The dust or microfine metal particles may become airborne and inhaled deeply into the lungs of persons in the general vicinity. Additionally, thick suspensions of dust become fire or explosion hazards as an explosion or fire may occur if the dust comes into contact with a spark of flame. Consequently, it is of great interest both to the proprietor and to the persons working in the shop to minimize the hazards arising from collection and suspension of dust and the like. Likewise, governmental regulations may impose similar safety requirements.

Prior attempts to eliminate sawdust, metal shavings, and the like from the machine shop work area have used a centralized vacuum system where a central vacuum motor pulls a vacuum through a series of ducts. The end of the ducts are open adjacent the machine areas where dust or wood collect. The dust then travels through the ductwork to a collection or storage bin that is emptied on a periodic basis. Currently, in furtherance of the art, gates controlling the flow of air through the ductwork may be used so that a vacuum or suction is only pulled in areas where actual work is being done. This eliminates the energy waste associated with the vacuuming of otherwise clean and dust free areas. It also reduces the load the vacuum has to pull.

Currently, blast gates are known in the art and may be controlled hydraulically or through air (as an alternative fluid). These gates are generally expensive and use a number of moving parts. Additionally, such blast gates and their hydraulic lines may be difficult to install, often requiring a professional. Such expense and difficulty may prevent their installation in smaller workshop areas where the initial cost may outstrip the monies available to pay for such a safety system.

Automatic control of such blast gates is preferred to manual operation as it is most the most efficient and convenient. While the preferred placement of blast gates is as close to the dust-creating machinery as possible, automatic also blast gates enable the spacing of the blast gates away from a flexible end of the duct so that it may have as much freedom as possible to operate, flexing under manual control to collect available dust, etc. or to be easily fixed in an advantageous dust-collecting position relative to a machine. Additionally, with manual gates, the operator must manually operate each of the gates for each of the machines. Gates that are left open when the associated machine is not being used are noisy and waste energy. Without the use of blast gates, the central dust collector must be much larger as the effective vacuum it must pull must match that necessary for every machine and every open duct.

Consequently, it is to some advantage to provide an inexpensive vacuum system using a simple and effective blast gate that is self-cleaning and provides automatic response to the operation of a machine for which dust needs collection. Such a system may use a simple, easy to manufacture, and easy to maintain blast gate that is signalled by a central processor. The central processor may receive signals from a sensor that detects whether or not a machine associated with the sensor is in operation and therefore whether or not dust should be collected at that location.

The invention described in the foregoing description and accompanying claim remedies many of the drawbacks presently exhibited by machine shop dust collection systems and does so in an inexpensive and highly-effective manner.

SUMMARY OF THE INVENTION

The present invention provides cost effective and energy efficient means by which hazardous or dangerous dust, filings, etc. may be collected in the professional or individual machine shop.

A blast gate provides effective valve means by which each one of several vacuum ducts may be individually controlled. The blast gate has a frame or chassis about a central panel, louver, or blade that pivots upon a central joint or hinge by means of a DC motor. Controlling the polarity of the electricity to the motor controls its direction. A slip clutch or the like allows the time of operation, and not a feedback switch, to determine whether or not the blade is fully opened or closed.

A central microprocessor senses signals from a piezoelectric or other machine sensor. The piezoelectric sensor and/or its signals may be enhanced by adjacent magnets. Each machine in the shop is associated with a blast gate and a sensor. When the machine operates, the sensor sends an operating signal to the microprocessor which then opens the blast gate and controls the operation of the dust collector or vacuum system in order to ensure proper suction volume.

As an advantageous element of the blast gate of the present invention, a small air intake is present allowing air flow from the chassis into the gap accommodating the blade. This prevents sawdust, shavings, and the like from settling into the gap between the two parts of the blast gate chassis. This consistently allows full closure of the blast gate by the blade, increasing its utility, lowering maintenance cost, and providing more reliable operation.

OBJECTS OF THE INVENTION

It is an object of the present invention to provide a dust collection system for a machine shop or the like.

It is another object of the present invention to provide such a dust collection system and an inexpensive but highly effective manner.

It is another object of the present invention to provide such a dust collection system that is energy efficient and therefor more ecologically sound.

It is another object of the present invention to provide a mechanically simple yet sophisticatedly designed blast gate that provides effective vacuum regulation means in a low maintenance and reliable manner.

It is another object of the present invention to provide a centralized control system by which such blast gates may be regulated in an energy efficient means, said central control also controlling the operation of the dust collection vacuum system.

These and other objects and advantages of the present invention will be apparent from a review of the following specification and accompanying drawings.

BRIEF DESCRIPTION OF THE DRAWINGS

FIG. 7 is a schematic diagram of an alternative embodiment of the present invention for handling a greater number of blast gates.

DESCRIPTION OF THE PREFERRED EMBODIMENT(S)

The present invention resides in a dust collection system for machine shops and the like that require the collection of dust generated by machining and woodworking processes. As a saw or the like operates, the workpiece upon which it acts may give rise to dust, shavings, filings, or the like during the machining or wood working process. For purposes of description, all such debris is designated as "dust" herein. For safety and health concerns, a duct, or conduit, may provide a dust-collecting vacuum adjacent the area where the dust is generated. Additionally, many machine tools of the present day incorporate a dust collection system that simply requires the connection of a vacuum system duct in order to reduce significantly, if not entirely, the dust that becomes freely available in the adjacent environment during the machining process.

Figure 1:
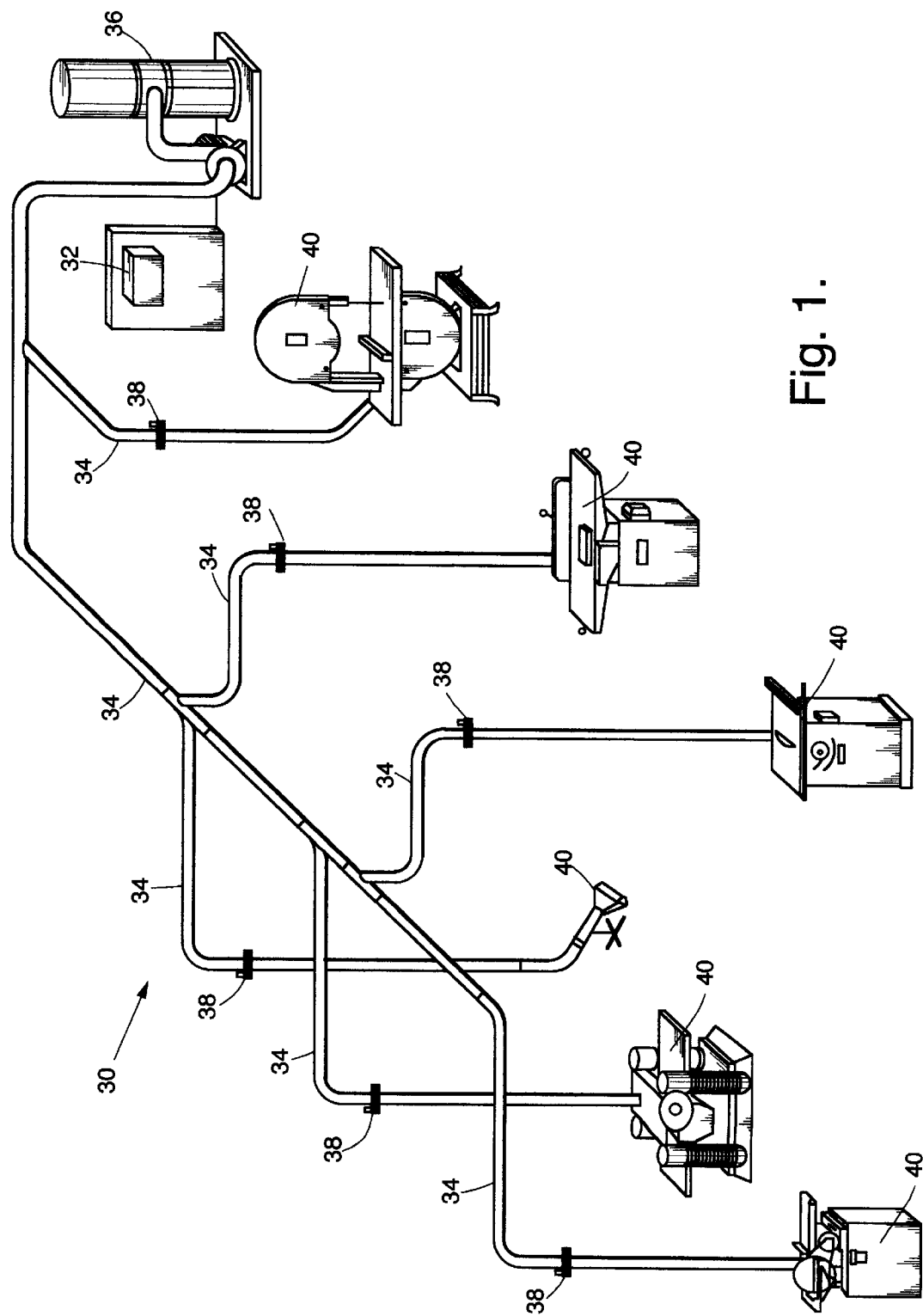
FIG. 1 shows a schematic diagram of the dust collection system of the present invention.

As shown in FIG. 1, the dust collection system 30 of the present invention has a central control box and microprocessor 32 which controls the operations of the entire system by means of a feedback mechanism accompanying the duct system 34. The central control 32 is additionally connected to the dust collector vacuum system 36. A series of valves or blast gates 38 (FIGS. 2 and 3) serve to regulate the transmission of the vacuum to the associated machinery 40. As can be seen from inspection of FIG. 1, such machinery includes saws of various sizes and types, rollers, lathes, band saws, etc. Also present is a floor sweep that brings the vacuum adjacent the floor so that debris may be swept towards the nozzle and taken up into the dust collector vacuum 36.

The sensor indicating the operation of specific machinery 40 is based on piezoelectricity. A piezoelectric device is attached, as by VELCRO™, to a machine for which a dust-collecting vacuum is desired when operating. When the machine is turned on, the vibration of the machinery causes the piezoelectric device to shake, or vibrate, slightly bending the piezoelectric crystal. The signals are transmitted to the central controller 32 where they indicate the operation of the machinery. In response to the sensor signals, the central controller 32 activates the dust collector vacuum 36. The vacuum is then transmitted to the appropriate machinery by means of the ductwork 34 and the blast gates 38.

Figure 2:
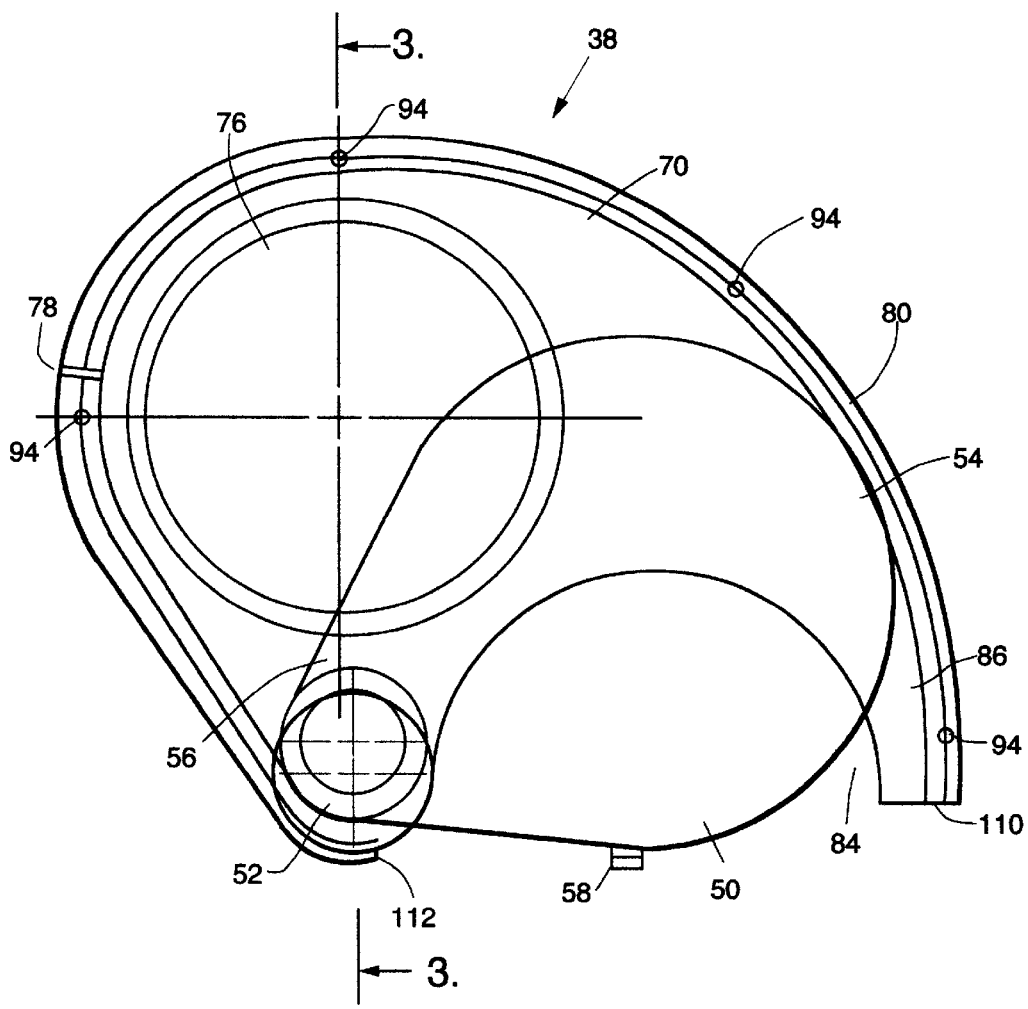
FIG. 2 is a front and partially cross sectional view of the electric blast gate valve of the present invention.
Figure 3:
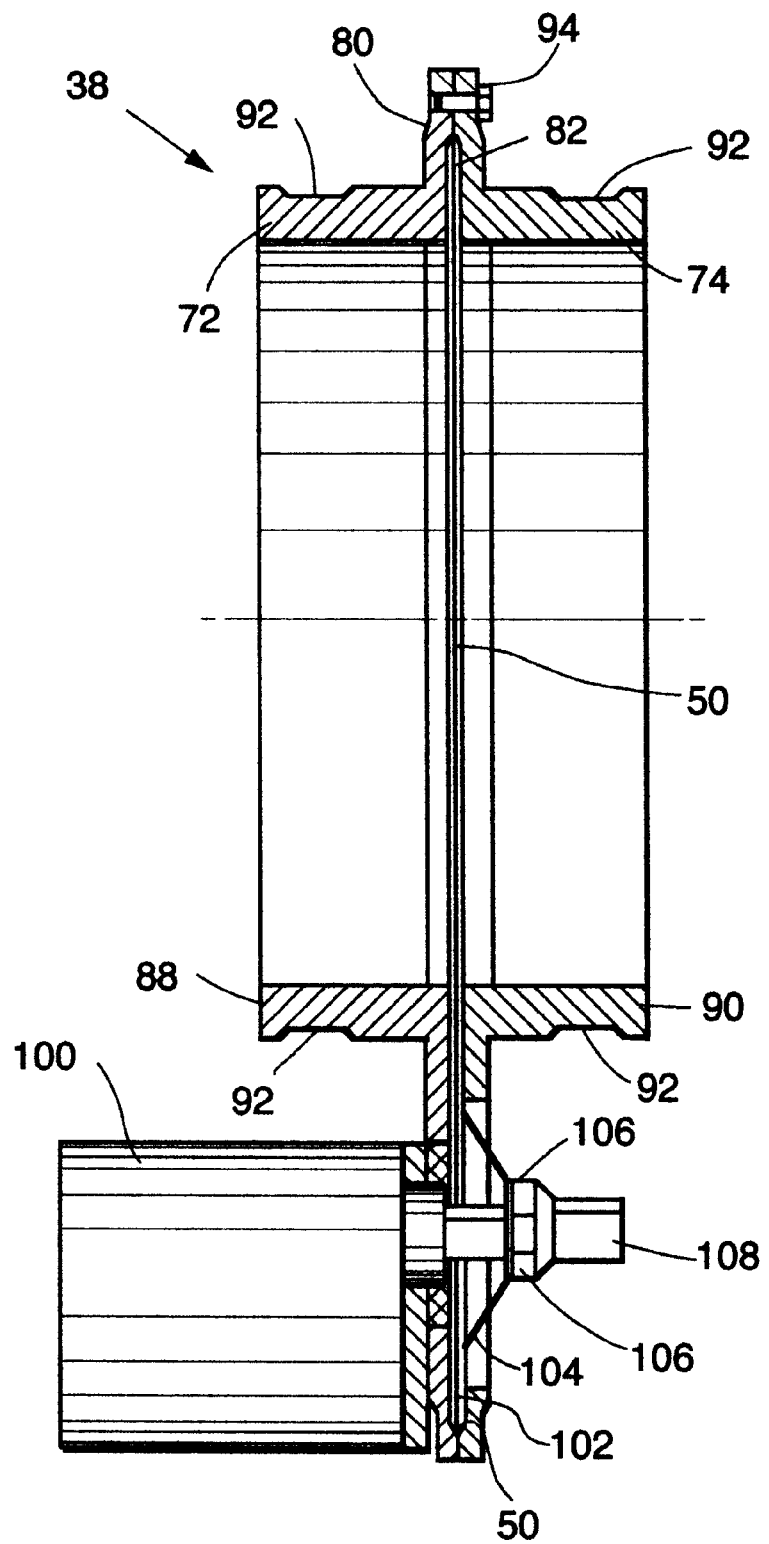
FIG. 3 is a side cross sectional view of the electric blast gate of FIG. 2 taken along line 3—3.

As shown in FIGS. 2 and 3, the blast gate 38 has an offset pivot 52 about which the rotating blade 50 rotates. The rotating blade 50 is pear-shaped or teardrop shaped, having a wider lobed outer end 54 and a narrower and more pointed inner end 56. The inner end 56 is that end about which the rotating blade 50 pivots. Additionally, a stop 58 may be present on the edge of the free side of the rotating blade 50. The stop serves as a means by which rotation of the rotating blade 50 into the blast gate 38 may be stopped. Additionally, the opposite side of the rotating blade 50 may also act as means by which pivoting motion of the rotating blade 50 may be stopped as it engages the chassis 70 of the blast gate 38. The stop 58 may also take the form of a pull ring that allows the installing workman or blast gate manufacturer to gauge the tension on the slip clutch. Appropriate adjustment of the slip clutch may then occur should it be necessary.

The chassis 70 has two half shells 72, 74, as shown in FIG. 3. The chassis has a central aperture 76 that acts as the main channel through which the vacuum flow proceeds. This is the channel that is obstructed by the rotating blade 50 to control the flow of the vacuum through the blast gate 38. The vacuum flow channel 76 is completely obstructed by the rotating blade 50 when the rotating blade 50 is rotated into position.

Additionally, an air intake opening 78 is present adjacent the main vacuum flow channel 76. The air intake opening 78 is propitiously positioned between the two half shells 72, 74 of the chassis 70 to ensure that the dust and the like being pulled toward the dust collector 36 does not lodge between the two halves 72, 74 of the chassis 70.

The rotating blade 50 rotates within a gap 82 defined between the two half shells 72, 74 of the chassis 70. An outward projection 80 of the blast gate 38 serves as means by which the two half shells 72, 74 may be connected to each other about their perimeter. As is shown in FIG. 3, the outward projection 80 at its outer end projects slightly toward the other half shell. This aids in defining the gap 82 between the two half shells within which the rotating blade 50 articulates as it spaces apart the two half shells 72, 74. As shown in FIG. 3, the rotating blade 50 projects beyond the main vacuum flow channel 76 within the gap 82 in order to ensure minimal "blow by" past the rotating blade 50 by gas and debris that would otherwise be drawn towards the dust collector 36 when the blast gate 38 is closed.

As shown in FIG. 2, a portion of the chassis 70 is cut out to provide an open section 84 into which the rotating blade 50 moves as it pivots to open the vacuum flow channel 76. The open section 84 provides means by which the rotating blade 50 may be manually engaged should it be necessary to do so. The open section 84 generally extends in a semi-circular fashion into a flared section 86 of the chassis 70. Manual engagement of the rotating blade 50 is, in addition to the open section 84, facilitated by means of the stop 58 which may be grasped or pinched to pull open the blast gate 76 by the rotating blade 50 away from the flow channel 76.

In general, the blast gate 38 may be made of durable materials, preferably those with low friction so that a close fit may be enjoyed between the chassis 70 and the rotating blade 50. The rotating blade 50 is preferably made of material sufficiently stiff so that it does not flex within the gap 82. By not flexing, the rotating blade 50 is less likely to get caught or jam within the gap 82. Also, friction through contact between rotating blade 50 and the chassis half shells 72, 74 is diminished.

As shown in FIG. 2, the top of the rotating blade 50 gently engages the inner portion of the outward projection 80.

When the rotating blade 50 is rotated to completely close the flow channel 76, the innermost portion of the outward projection 80 should be in contact with as much of the perimeter of the rotating blade 50 as possible to ensure the greatest possible seal. As shown in FIG. 2, the air intake opening 78 may be approximately one-sixteenth inch (1/16") in diameter and positioned so that it is just above a midline of the rotating blade 50 when it is completely closed and obstructing the vacuum flow channel 76.

In order to provide means by which the blast gate 38 may be attached to the ductwork 34, flanges 88, 90 circumscribe the vacuum channel 76. The flanges 88, 90 allow the blast gate 38 to be mounted into the duct system close to the operating machinery by means of pipe clamps or the like. As shown in FIG. 3, notches 92 serve as means by which such pipe clamps may better engage the flanges 88, 90. Ring clamps may also serve well for the same purposes. Gate assembly screws 94 serve to couple the two halves of the chassis 72, 74 to one another at the outward perimeter projection 80 of the chassis 70.

As can be seen, an advantageous blast gate 38 may be constructed that has a high degree of valuing activity, enabling the secure opening and closure of the central vacuum channel 76 by means of a rotating blade 50 in a chassis 70. In order to enhance the utility of the blast gate 38 of the present invention, motorized means such as a DC motor 100 may be used to open and close the rotating blade 50. The DC motor 100 turns clockwise or counterclockwise depending upon the polarity of the DC current applied to the motor. One polarity of DC current will turn the DC motor 100 clockwise (opening the blast gate 38 as shown in FIG. 2), while the opposite polarity will cause the drive shaft of the DC motor 100 to turn counterclockwise (closing the blast gate 38).

The DC motor 100 is coupled to the rotating blade 50 by means of a slip clutch that allows the motor to turn although the blade 50 has stopped. Comprising the slip clutch are a keyed washer 102, a keyed spring washer 104, and a self-cutting nut 106. The rotating blade 50 and the chassis 70 define coaxial apertures through which the drive shaft 108 of the DC motor 100 passes to define the offset pivot 52 about which the rotating blade 50 rotates. As best shown in FIG. 3, the keyed washer 102 rests adjacent the motor 100 and the first chassis half shell 72. The rotating blade 50 is then present adjacent the keyed washer. The second chassis half shell 74 is then laid over the rotating blade to correspond with the first chassis half shell 72. The gate assembly screws 94 then fix the two half shells 72, 74 with respect to one another. The keyed spring washer 104 is then fitted over the drive shaft 108 with the self-cutting nut 106 cutting its threads upon the drive shaft 108 to secure the keyed spring washer into place.

The self-cutting nut 106 is threaded onto the drive shaft 108 so far as to secure the rotating blade 50 between the keyed washer 102 and the keyed spring washer 104 without overtightening. In this manner, there is some slippage between the drive shaft 108 and rotating blade 50 should the further rotating passage of the rotating blade 50 be obstructed as by the chassis 70 or otherwise. In order to obstruct the continued outward travel of the rotating blade 50 away from the vacuum channel 76, the gap 82 between the two half shells 72, 74 may be obstructed or filled in at the far end 110 of the chassis 70 or, preferably, by the arcuate spur end 112 of the chassis 70 adjacent the offset pivot 52 and the narrower pointed inner end 56 of the blade 50.

Once obstructed, the drive shaft 108 may continue to turn if the DC motor 100 is continuously powered. However, the frictional fit between the two keyed washers 102, 104 and/or that between the keyed spring washer 104 and the self-cutting nut 106 may serve as a slip clutch which allows the drive shaft to continue to turn without turning the rotating blade 50. This frictional fit between the keyed washers 102, 104 is determined by the pressure at which the self-cutting nut 106 is set into place. Such pressure needs to be weak enough to allow the drive shaft 108 to turn while the motor 100 is powered yet strong enough to turn the rotating blade 50 under a variety of vacuum pressures and conditions. As the keyed spring washer 104 is made up of a number of flexible leaves comprising the spring, the pressure upon the keyed spring washer 104 may be gauged generally to good effect with the craft becoming more evident with greater experience in adjusting the self-cutting nut 106. As will be described in more detail below, when the DC motor 100 is powered, it is generally given a 10% more time period than is necessary for the entire opening or closing of the blast gate 38. This ensures that the blast gate changes its state completely (from either open to closed or closed to open) without undue burden upon the slip clutch. The DC motor may have 1:270 ratio gearbox integral to the DC motor 100. In embodiments achieved for the blast gate of the present invention, this gear ratio of 1:270 was preferable to others (such as 1:420) as it delivered sufficient mechanical advantage with good response time.

By means of the slip clutch, limit switches are not necessary. This reduces the overall signal burden and complexity as well as the component complexity of the present invention, better ensuring its proper operation and reliability. Additionally, this reduces service requirements. As for the other signal and electrical components of the present invention, DC power is delivered from the central controller 32 by means of a shielded wire. According to one embodiment of the present invention, it takes approximately two seconds for the blast gate to change from a closed state to an open state or vice versa. Mechanical limiters are present at the end positions for the blast gate 38 ensuring that its motion stops at the completely open and completely closed states of the blast gate 38.

Figure 4:
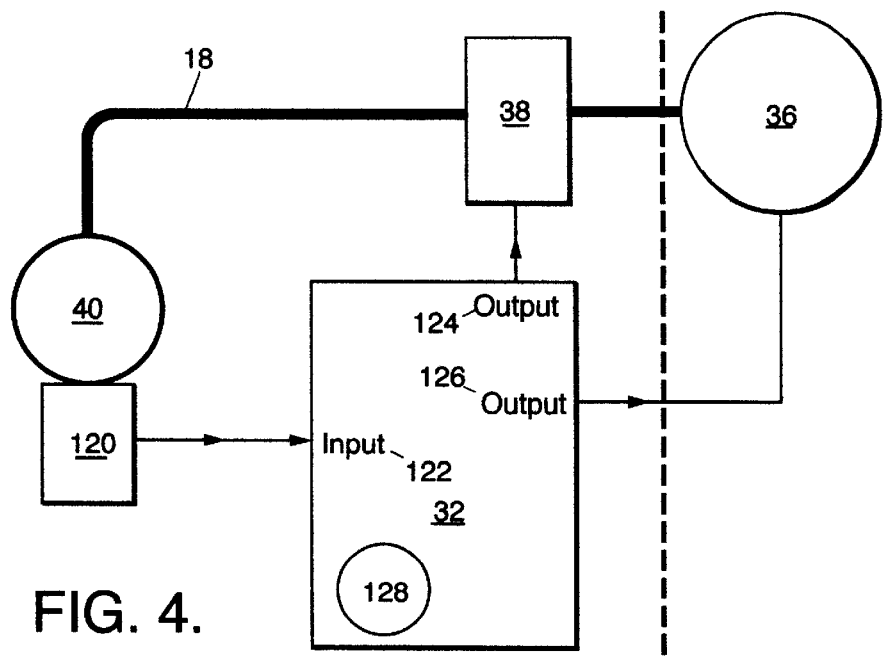
FIG. 4 is a schematic diagram of the signal paths present for operation of the single blast gate valve and associated machinery.

As shown in FIG. 4, the central controller 32 generally comprises a programmed or programmable microprocessor. FIG. 4 shows the configuration for one machine 40, but the configuration shown in FIG. 4 may be extended to a number of individual machines 40, such as 6 machines (FIG. 6), or 24 machines (FIG. 7). In order to signal the central controller 32 that the machine 40 is operating, a piezoelectric sensor 120 is attached to the machine 40 by means of a hook and loop fastener (VELCRO™) or the like. Other means of attachment, such as permanent attachment, may also be used to good advantage. As mentioned above, a shielded cable couples the piezoelectric sensor 120 to the central controller 32.

Preferably, the piezoelectric sensor 120 is sandwiched between two disc magnets. By sandwiching the piezoelectric sensor 120 between magnets, the signals transmitted by the piezoelectric sensor 120 are magnified and stronger. It therefore becomes an easier process to distinguish the signals transmitted by the piezoelectric sensor 120 from other signals, including random noise on the signal line. The piezoelectric sensor 120 and the sandwiching magnets may be housed inside a plastic box or chamber. Attachment as by VELCRO™ hook and loop fastener may be made between the machinery requiring dust removal and the plastic sensor-containing box.

To enhance the operation of the present invention, the central controller 32 may be pre-programmed with instructions that allow the central controller 32 to better distinguish what signals are transmitted by the piezoelectric sensor 120 from other, possibly noise-derived, signals. Such pre-programming may be achieved through erasable-programmable read only memory (EPROM) or other sophisticated firmware appropriately programmed to retain such signal-distinguishing instructions.

When the machinery 40 begins to operate, it vibrates and causes the crystal in the piezoelectric sensor 120 to slightly bend as it vibrates, transmitting electric signals along the shielded cable to an input 122 of the central controller 32. Upon sensing new signals (indicating machine operation) upon the input 122, the central controller 32 initially opens the blast gate 38 by transmitting a signal to the blast gate 38 via a blast gate output 124. The output transmitted by the blast gate output includes a selectably polarized signal that causes the DC motor 100 of the blast gate 38 to open. As mentioned above, the motor signal is of specific DC polarity and lasts for approximately two seconds, approximately 110% of the time necessary to open the blast gate. The extra 10% is to ensure that the blast gate 38 completely opens even though there is forced slippage of the slip clutch in opening the rotating blade 50.

Approximately two seconds after the blast gate 38 has been signaled to open by the central controller 32, the dust collector vacuum system 36 is signalled via a dust collector output 126 of the central controller 32. If the dust collector output is off, it is turned on after the blast gate 38 has opened. If the dust collector 36 is currently on, its power may be stepped up to accommodate the additional vacuum load after the selected blast gate 38 has been opened. The vacuum pulled by the dust collector 36 is then transmitted to the ductwork 18 and passes through the open blast gate 38 onto the machinery 40.

All the time that the machinery 40 is operating, it continues to vibrate causing the piezoelectric sensor 120 to signal the piezoelectric sensor input 122 of the central controller 32. This maintains the open state of the blast gate 38 and the relevant power level of the dust collector 36. When the machinery 40 is turned off, it stops vibrating and the associated piezoelectric sensor likewise ceases vibrating. The piezoelectric sensor input 122 of the central controller 32 falls quiet, causing the central controller to first step down or turn off (as appropriate) the dust collector 36 followed by the closure of the blast gate 38. The cycle may then be reinitiated upon the next use of the machinery 40. Alternatively, a manual switch 128 may be used to manually override the piezoelectric 120 and its signal to piezoelectric sensor input 122.

Figure 5:
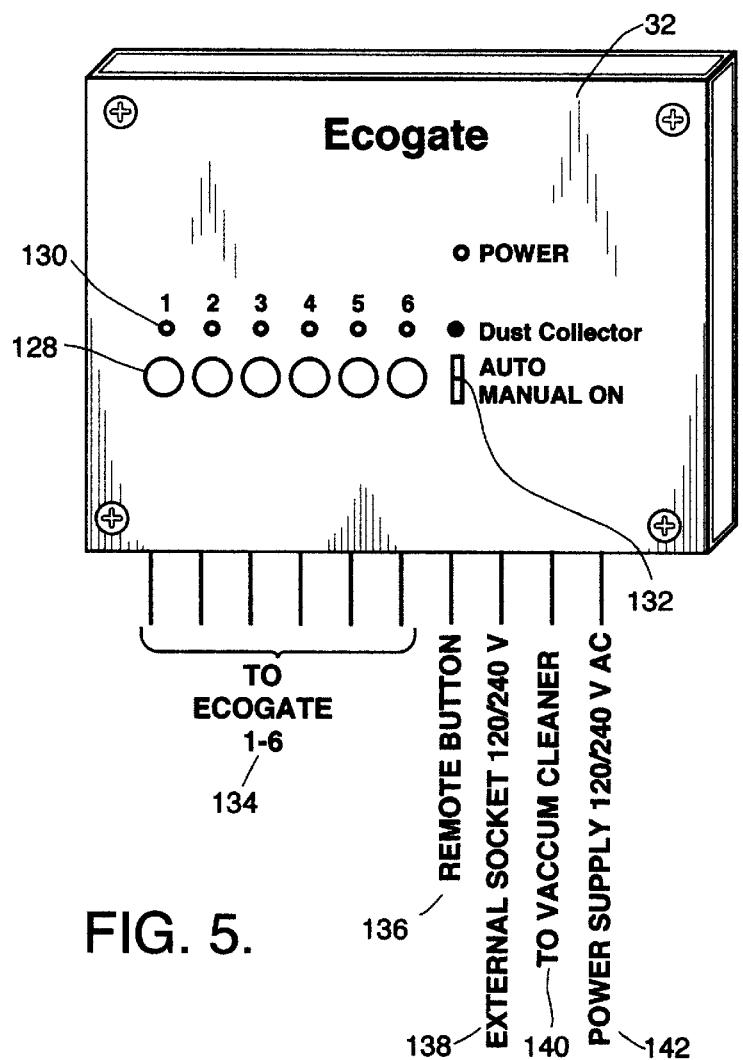
FIG. 5 is an external perspective view of the central controller used in the present invention.

As shown in FIG. 5, the central controller 32, may have a descriptive exterior with identifying indicia that allows the person inspecting it to determine the state of the vacuum system of the present invention 30 as a whole. LED indicators 130 indicate the operating state of the blast gate and the direction through the ductwork 18 the vacuum flow delivered by the dust collector 36 is delivering. Additionally, an activation switch 132 is present that allows the central controller 32 to be controlled as to whether it operates automatically or if manual operation is allowed. A series of signal lines 134 provide communication between the central controller 32 and the blast gates 38 and the piezoelectric sensors 120. As an additional feature, the central controller 32 may have a remote button allowing for remote operation of a blast gate such the one shown in FIG. 1 for floor sweeping and the like. Additionally, an exterior socket supplying 120/240 volt power 138 may be present that allows the central controller 32 to determine whether or not a tool connected to the exterior socket 138 is turned on. If so, the central controller 32 may open one of the blast gates, for example gate number 6, and activate the dust collection for the plugged in tool. In order to sense the current, a toroidal current transformer may be used.

Additionally, a signal line 140 to the dust collector/vacuum cleaner 36 is present, as may be present a line 142 to a 120/240 volts power supply. As set forth above, most of the signal lines present in the present invention are made through shielded two-conductor cable. The shielding for such cable is grounded and helps to control static electricity in the depth system. In one embodiment of the central controller 32, an Intel 8052 microprocessor may be used in the central controller 32.

Figure 6:
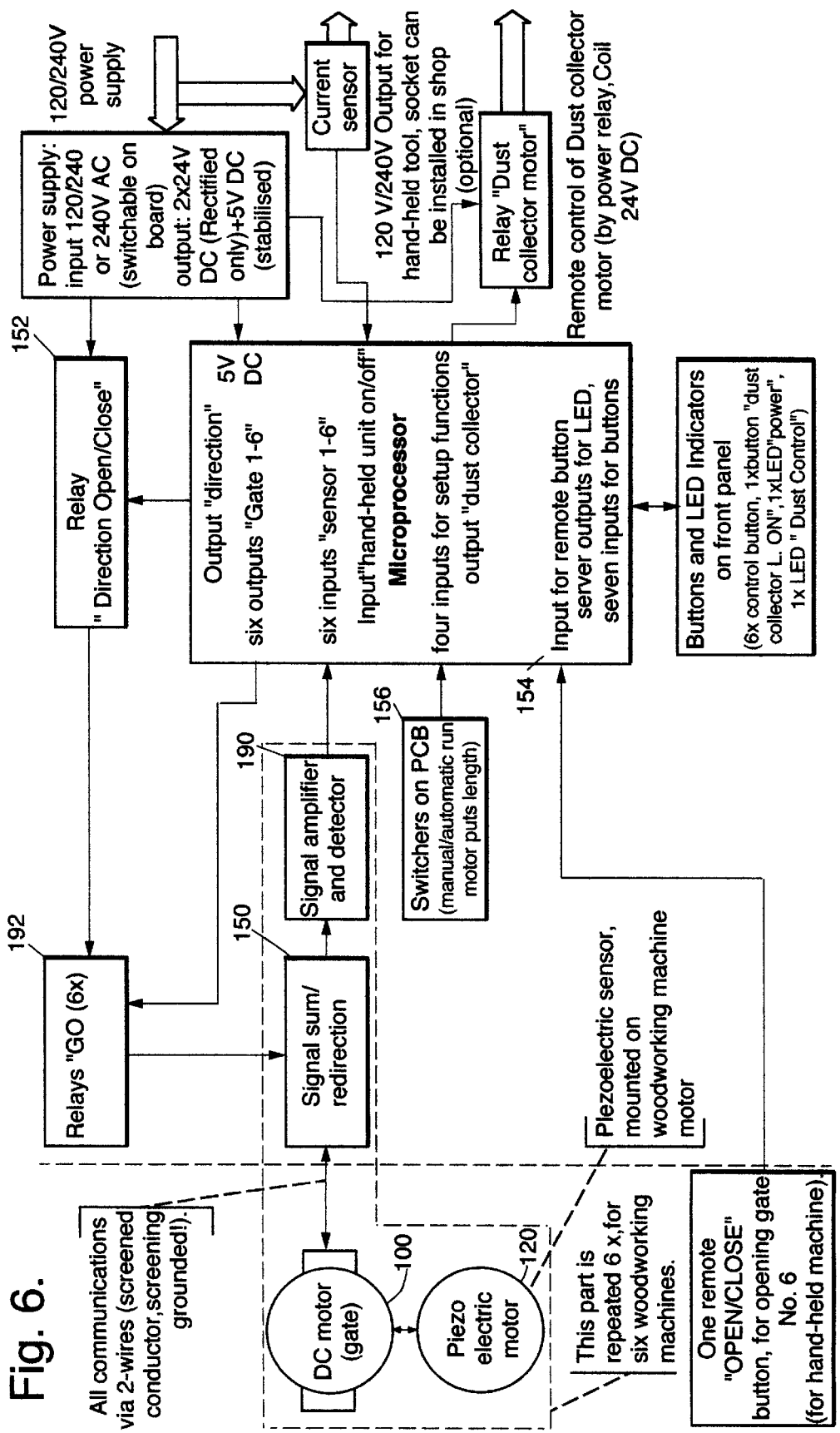
FIG. 6 is a schematic showing in more detail the signal processing and element construction of the schematic in FIG. 4.

As shown in FIGS. 6 and 7, schematic diagrams for the system 30 of the present invention may allow simple or complex configurations using 6 or 24 blast gates to control the vacuum produced by the dust collector 36. In one sense, FIGS. 6 and 7 are expanded versions of FIG. 4 showing the many components comprising the present invention. As shown in FIGS. 6 and 7, the block marked "signal/sum redirection" 150 indicates a low voltage relay connecting the output of the associated "go" relay when the state of the blast gate 38 is to be changed by activation of the DC motor 100. At all other times, the signal sum/redirection low voltage relay 150 connects the microprocessor 154 to the piezoelectric sensor 120 so that the signal from the sensor 120 may be read by the microprocessor 154. In order to control the direction of the DC motor 100 on each of the blast gates 38, a direction relay 152 changes the polarity necessary for opening and closing the blast gate 38. The direction relay 152 is also controlled by the microprocessor 154.

The "signal sum redirection" relay 150 selectably connects to either the signal amplifier and detector 190 or the go relay 192. When the state of the blast gate 38 is to be changed (off to on, on to off), the microprocessor 154 activates the relay 150 to establish a connection between the signal sum redirection relay 150 and the go relay 192. The microprocessor 154 may then transmit the power pulse of the correct polarity to the DC motor 100 to open or close it. Upon completion, the relay 150 reverts to its connection with the signal amplifier 190 to await and detect signals from the sensor 120.

In one embodiment, the DC motor 100 and the piezoelectric sensor 120 are connected in parallel. Two diodes (not shown) are in series with the DC motor 100 and isolate it from the sensor 120. The two diodes are connected in parallel with respect to each other and conduct in opposite directions. As the output of the sensor 120 is generally around 500 mV, sensor output does not overcome the bias of the diodes and the sensor output is not conducted by short circuit through the DC motor 100. Instead, the sensor output is conducted to the microprocessor 154 of the central controller 32 via the relay 150 and the signal amplifier and detector 190. The signals from the go relay 192 exceed 600 mV and are impressed upon the DC motor 100 to control the blast gate 38.

Additionally, DIP switches 156 may be present by which the length of the pulses for the DC motors 100 may be set. The automatic/manual switch 132 may control the automatic or forced-on mode of the dust collector 36, respectively. When the central controller 32 is first turned on it performs a self-diagnostic test to confirm proper operation.

Upon turn on or power up, all of the connected gates 38 are sequentially closed. In one embodiment, if all tests are nominal, the LEDs of the central controller 32 may flash three times, if there is a problem, remain flashing. In one embodiment, a complete test of the central controller 32 can be performed by pressing any of the push buttons on the front panel when the power to the central controller 32 is connected. Under some circumstances, all of the connected blast gates 38 sequentially open and close until the power is switched off. Such opening and closing determined by the pressing of the associated manual engagement button on the front of the central controller 32.

A 24-volt DC power supply is provided by the central controller 32. This power supply runs the DC motors 100 present in the blast gates 38. Additionally, a 5-volt DC voltage source is present for the microprocessor 154. The ±24-volt power sources are isolated because of the change of polarity required for the DC motors 100 of the blast gates 38 to open and close. Power supply to the central controller 32 may be 120-volt or 240-volt AC and may be switchable on the DIP switches 156.

The schematic shown in FIG. 6 pertains generally to the control of 6 blast gates 38. The schematic shown in FIG. 7 pertains to the control of 24 blast gates 38. Additional features comprising additional embodiments of the present invention are shown in FIG. 7 including the regulation of actual power to the dust collector by an analog output voltage regulator 160 controlling an output signal ranging from 0–10 volts. Additionally, "a virtual limit switch" 162 may be added which detects the current increase of the blast gates when a rotating blade begins working against the mechanical limit. The virtual limit switch 162 increases the system reliability as the increased current provides a signal that is read by the microprocessor of the central controller 32 and stops the power supply to the DC motor 100.

Additionally, a 1-kilohertz square wave signal 170 may be generated by the microprocessor and amplified 172 before being sent back to the piezoelectric sensor 120. The 1-kilohertz signal causes the piezoelectric sensor 120 to act as an audio signal that the opening and closing of the blast gate 38 has been successful. It also indicates that the circuit to the sensor 120 is uninterrupted and continuous.

An LCD display with back lighting 180 may also be present as shown in FIG. 7. The LCD display provides display means by which the status, operating conditions, and operating choices may be conveyed to a viewer. Additionally, when coupled with buttons or switches on the front of the central controller 32, may provide by which such control may be more easily affected.

A serial port such as an RS-232C port 184 may be present by which the central controller 32 may be coupled to a personal or other type of computer for computerized monitoring and control of the central controller 32. Set up functions may be downloaded from the computer to the central controller 32 with record information or data uploaded to the computer through the port 184. A backup function may also be provided by which EEPROM memory may serve to save the status and condition of the microprocessor and related circuitry of the central controller 32. Additionally, such back up information may be sent to a computer attached to the serial port 184.

While the present invention has been described with regards to particular embodiments, it is recognized that additional variations of the present invention may be devised without departing from the inventive concept.

What is claimed is:

1. A blast gate valve for controlling transmission of vacuum pressure in a machine shop vacuum system, comprising:

a chassis, said chassis connectable to vacuum system duct work, said chassis defining a flow channel through which the vacuum pressure is transmitted, said chassis defining a central gap, said central gap extending outwardly away from said flow channel;

a rotating blade, said rotating blade pivotably coupled to said chassis, said rotating blade travelling within said central gap, said rotating blade having an optimal teardrop or pear shape for conserving materials and providing a lightweight and effective occlusion blade and so that a majority of said rotating blade serves as an occluding portion of said occlusion blade for the blast gate valve, said rotating blade passing entirely through said gap so that said rotating blade extends past a perimeter of said flow channel to better occlude transmission of vacuum pressure;

an air inlet, said air inlet defined by said chassis adjacent said flow channel, said air inlet interconnecting an environment external to said chassis with said central gap whereby debris such as dust, shavings, and the like are kept clear of said central gap by airflow through said air inlet when vacuum pressure is transmitted by the blast gate valve, said air inlet optimally positioned so that it intersects said central gap adjacent said rotating blade at a widest point of said rotating blade when the blast gate valve is closed;

a semi-circular cut out section, said semi-circular cut out section defined by said chassis and spaced apart from said flow channel, said semi-circular cut out section allowing manual access to said rotating blade while reducing weight and materials required of said chassis;

a DC motor, said DC motor coupled to said chassis and said rotating blade whereby said motor may rotate said rotating blade with respect to said chassis, polarity of current supplied to said DC motor controlling a direction of rotation of said rotating blade;

a washer, said washer coupled to one side of said chassis and coaxial with a drive shaft of said motor;

a spring washer, said spring washer coupled to another side of said chassis and coaxial with said drive shaft; and a nut, said nut engaging said drive shaft adjacent said spring washer and holding said spring washer against said rotating blade, said washers forming a slip clutch so that said rotating blade is urged against said washer by said spring washer sufficient to hold said rotating blade in place with respect to said drive shaft when said rotating blade is free to turn, yet insufficient to hold said rotating blade in place with respect to said drive shaft when said rotating blade is not free to turn; whereby said rotating blade may pivotably rotate to selectably occlude said flow channel thereby opening and closing the blast gate valve.

2. An automatic machine shop vacuum system, comprising:

a dust collector, said dust collector creating a vacuum;

at least one machine, said machine generating dust or shavings to be collected by said dust collector, said machine coupled to said dust collector by a duct, said duct transmitting vacuum pressure to said machine;

a blast gate valve, said blast gate valve coupled to said duct and selectably controlling transmission of said vacuum pressure to said machine;

a sensor, said sensor coupled to said machine and transmitting a signal when said machine is on that is different from a signal transmitted by said sensor when said machine is off; and a controller, said controller coupled to said dust collector, said blast gate valve, and said sensor, said controller operating said dust collector and said blast gate valve in response to said sensor signals; whereby dust generated by said machine during a machining process is automatically collected by said dust collector when said machine is turned on, said controller energizing said dust collector and opening said blast gate valve in response to sensor signals indicating the operation of said machine, said controller de-energizing said dust collector and closing said blast gate valve in response to sensor signals indicating the non-operation of said machine.

3. The automatic machine shop vacuum system of claim 2, wherein said blast gate valve comprises:

a chassis, said chassis connectable to vacuum system duct work, said chassis defining a flow channel through which the vacuum pressure is transmitted, said chassis defining a central gap, said central gap extending outwardly away from said flow channel;

a rotating blade, said rotating blade pivotably coupled to said chassis, said rotating blade travelling within said central gap, said rotating blade having an optimal teardrop or pear shape for conserving materials and providing a lightweight and effective occlusion blade and so that a majority of said rotating blade serves as an occluding portion of said occlusion blade for the blast gate valve, said rotating blade passing entirely through said gap so that said rotating blade extends past a perimeter of said flow channel to better occlude transmission of vacuum pressure;

an air inlet, said air inlet defined by said chassis adjacent said flow channel, said air inlet interconnecting an environment external to said chassis with said central gap whereby debris such as dust, shavings, and the like are kept clear of said central gap by airflow through said air inlet when vacuum pressure is transmitted by the blast gate valve, said air inlet optimally positioned so that it intersects said central gap adjacent said rotating blade at a widest point of said rotating blade when the blast gate valve is closed;

a semi-circular cut out section, said semi-circular cut out section defined by said chassis and spaced apart from said flow channel, said semi-circular cut out section allowing manual access to said rotating blade while reducing weight and materials required of said chassis;

a DC motor, said DC motor coupled to said chassis and said rotating blade whereby said motor may rotate said rotating blade with respect to said chassis, polarity of current supplied to said DC motor controlling a direction of rotation of said rotating blade;

a washer, said washer coupled to one side of said chassis and coaxial with a drive shaft of said motor;

a spring washer, said spring washer coupled to another side of said chassis and coaxial with said drive shaft; and a nut, said nut engaging said drive shaft adjacent said spring washer and holding said spring washer against said rotating blade, said washers forming a slip clutch so that said rotating blade is urged against said washer by said spring washer sufficient to hold said rotating blade in place with respect to said drive shaft when said rotating blade is free to turn, yet insufficient to hold said rotating blade in place with respect to said drive shaft when said rotating blade is not free to turn; whereby said rotating blade may pivotably rotate to selectably occlude said flow channel thereby opening and closing the blast gate valve.

4. The automatic machine shop vacuum system of claim 2, wherein said sensor is a piezoelectric sensor.

5. A controller for an automatic machine shop vacuum system, comprising:

a processor, said processor being programmable or programmed, said processor receiving and transmitting signals to control the automatic machine shop vacuum system, said processor coupled to a dust collector and a first blast gate valve; and a first piezoelectric sensor, said first piezoelectric sensor coupled to a first machine and indicating an on/off operating condition of said first machine, said first piezoelectric sensor transmitting signals indicating said operating condition to said processor, said first machine coupled to said dust collector by duct work controlled by said first blast gate valve; whereby said processor activates said dust collector and opens said first blast gate valve upon receiving sensor signals that said first machine is on and said processor deactivates said dust collector and closes said first blast gate valve upon receiving sensor signals that said first machine is off.

6. The controller for an automatic machine shop vacuum system of claim 5, further comprising:

a second piezoelectric sensor, said second piezoelectric sensor attached to a second machine and indicating an on/off operating condition of said second machine, said second piezoelectric sensor transmitting signals indicating said condition to said processor, said second machine coupled to said dust collector by duct work controlled by a second blast gate valve; and said processor independently controlling said first and second blast gate valves and a level of operation of said dust collector; whereby vacuum pressure generated by said dust collector is independently administrated by said processor by opening and closing said first and second blast gate valves to direct said vacuum pressure only to operating machines.

7. A blast gate valve for controlling transmission of vacuum pressure in a machine shop vacuum system, comprising:

a chassis, said chassis connectable to vacuum system duct work, said chassis defining a flow channel through which the vacuum pressure is transmitted, said chassis defining a central gap;

a rotating blade, said rotating blade pivotably coupled to said chassis, said rotating blade travelling within said central gap; whereby said rotating blade may pivotably rotate to selectably occlude said flow channel thereby opening and closing the blast gate valve; and wherein said chassis further comprises an air inlet, said air inlet defined by said chassis and adjacent said flow channel, said air inlet interconnecting an environment external to said chassis with said central gap; whereby debris such as dust, shavings, and the like are kept clear of said central gap by airflow through said air inlet when vacuum pressure is transmitted by the blast gate valve.

8. The blast gate valve of claim 7, wherein said air inlet is optimally positioned to keep debris clear of said central gap.

9. The blast gate valve of claim 8, wherein said air inlet is positioned so that it intersects said central gap adjacent said rotating blade at a widest point of said rotating blade when the blast gate valve is closed.

10. A blast gate valve for controlling transmission of vacuum pressure in a machine shop vacuum system, comprising:

a chassis, said chassis connectable to vacuum system duct work, said chassis defining a flow channel through which the vacuum pressure is transmitted, said chassis defining a central gap and having a cut out section, said cut out section defined by said chassis and spaced apart from said flow channel, said cut out section allowing manual access to a rotating blade hereinafter defined while reducing weight and materials required of said chassis; and a rotating blade, said rotating blade pivotably coupled to said chassis, said rotating blade travelling within said central gap; whereby said rotating blade may pivotably rotate to selectably occlude said flow channel thereby opening and closing the blast gate valve.

11. The blast gate valve of claim 10, wherein said cut out section is generally semi-circular.

12. A blast gate valve for controlling transmission of vacuum pressure in a machine shop vacuum system, comprising:

a chassis, said chassis connectable to vacuum system duct work, said chassis defining a flow channel through which the vacuum pressure is transmitted, said chassis defining a central gap;

a rotating blade, said rotating blade pivotably coupled to said chassis, said rotating blade travelling within said central gap, a motor, said motor being coupled to said chassis and said rotating blade to rotate said rotating blade relative to said chassis and wherein said rotating blade may be stopped while said motor continues to turn without damaging said motor; whereby said rotating blade may pivotably rotate to selectably occlude said flow channel thereby opening and closing the blast gate valve.

13. The blast gate valve of claim 12, further comprising:

a slip clutch, said slip clutch coupled to said motor, said chassis, and said rotating blade; whereby stopping of said rotating blade causes said slip clutch to slip and allow said motor to slip with respect to said rotating blade, allowing said motor to continue to operate without damage.

14. The blast gate valve of claim 13, wherein said slip clutch further comprises:

a washer, said washer coupled to one side of said chassis and coaxial with a drive shaft of said motor;

a spring washer, said spring washer coupled to another side of said chassis and coaxial with said drive shaft; and a nut, said nut engaging said drive shaft adjacent said spring washer and holding said spring washer against said rotating blade; whereby said rotating blade is urged against said washer by said spring washer and said nut sufficient to hold said rotating blade in place with respect to said drive shaft when said rotating blade is free to turn, yet insufficient to hold said rotating blade in place with respect to said drive shaft when said rotating blade is not free to turn.

* * * * *